Jan. 5, 1960  D. R. REASON ET AL  2,919,614
CLAMPING DEVICE
Filed July 5, 1955  2 Sheets-Sheet 1
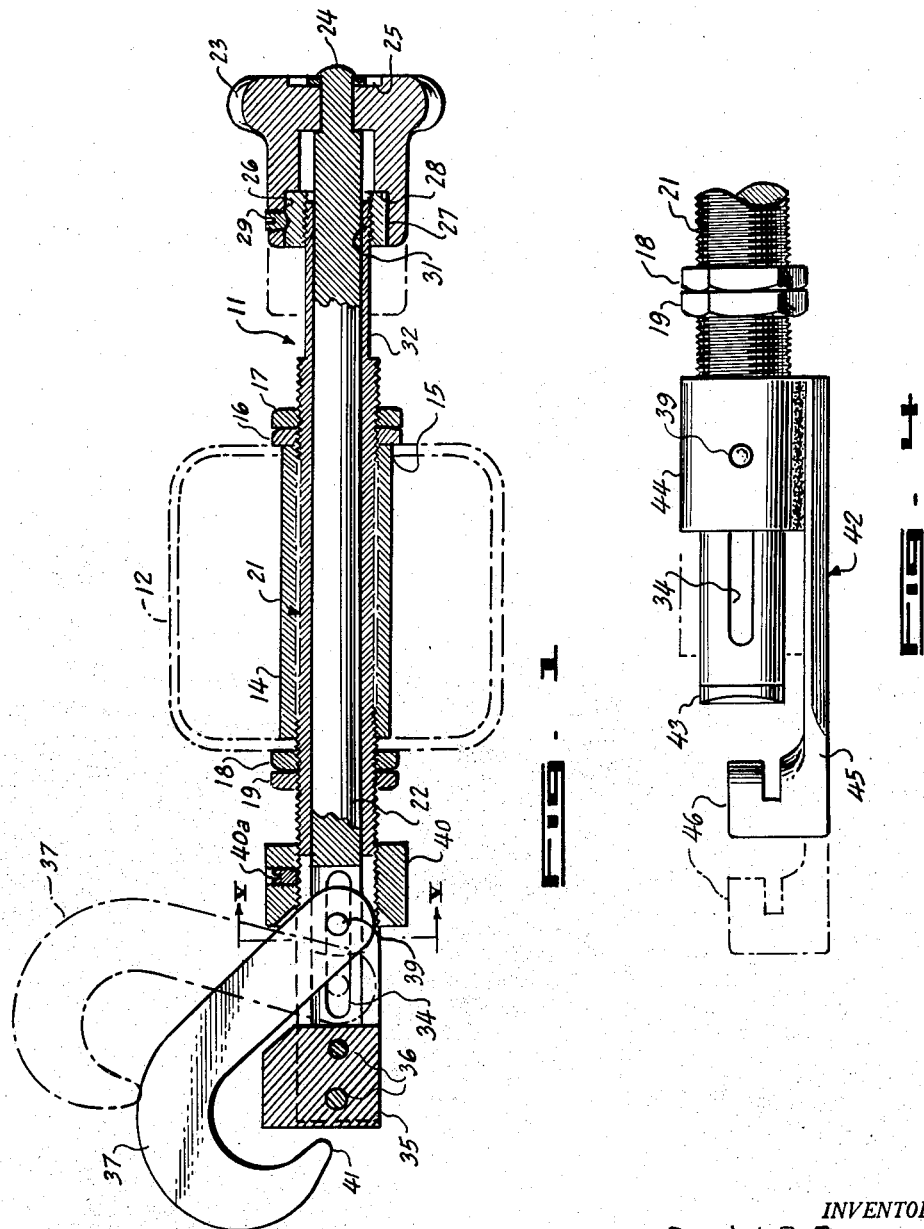
INVENTORS:
Daniel R. Reason,
BY & Clinton A. Bay
ATTORNEY Jan. 5, 1960   D. R. REASON ET AL   2,919,614
CLAMPING DEVICE
Filed July 5, 1955   2 Sheets-Sheet 2
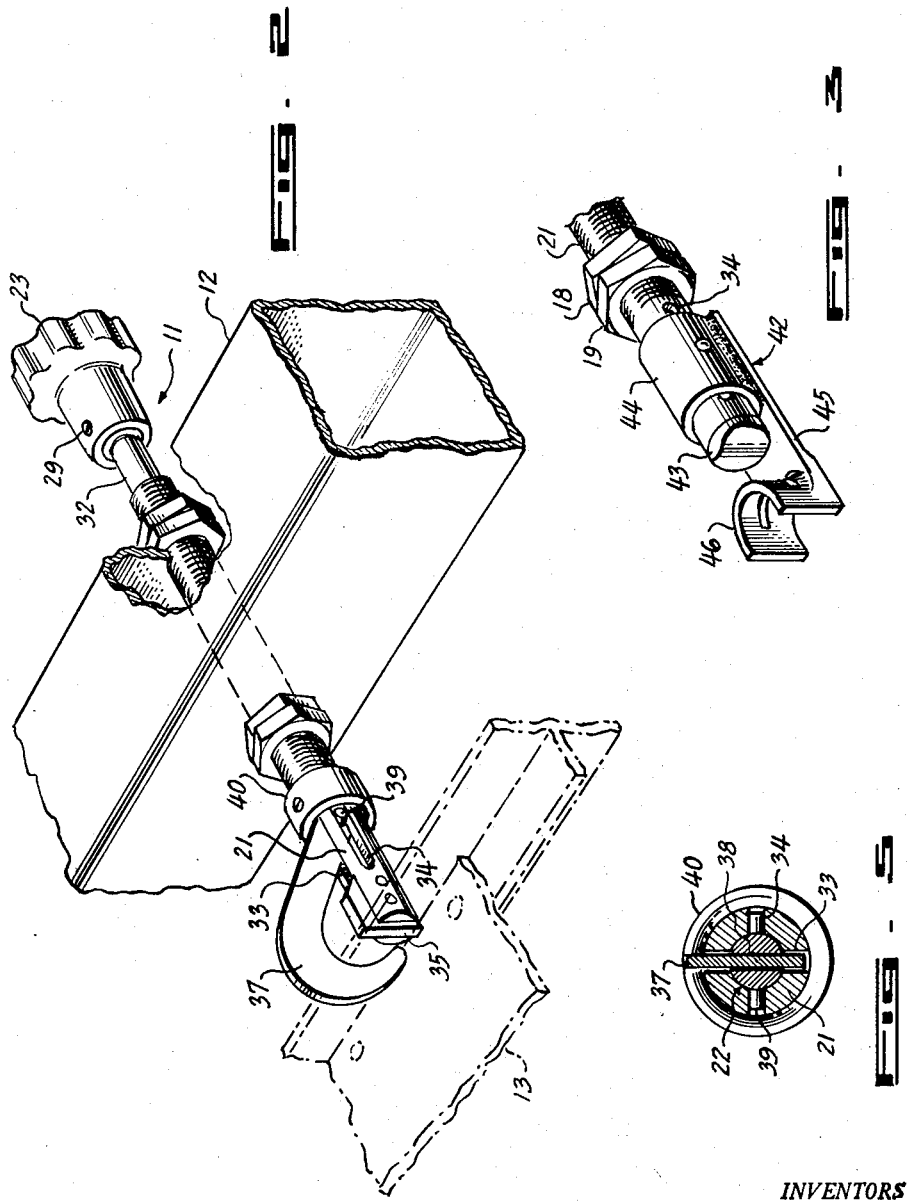
INVENTORS:
Daniel R. Reason,
BY & Clinton A. Bay
ATTORNEY United States Patent Office 2,919,614
Patented Jan. 5, 1960

2,919,614

CLAMPING DEVICE

Daniel R. Reason, Birmingham, Mich., and Clinton A. Bay, Fort Worth, Tex., assignors to General Dynamics Corporation, (Convair Division), San Diego, Calif., a corporation of Delaware Application July 5, 1955, Serial No. 520,027

6 Claims. (Cl. 81—21)

The present invention relates to clamps, and more particularly to clamps which are adapted to accurately locate and clamp elements or components in a predetermined position.

In the production assembly of structural components, the trend recently has been toward increasing automatization of fastening operations such as riveting and the like. Since automatization greatly depends for success upon reliable temporary location and securement of the elements or parts which are to be assembled by the automatic machines, it will be apparent that temporary clamping devices are important elements of any production system which utilizes automatic fastening machines. Precision in assembly cannot be had unless the clamping devices used are adapted for locating and holding subassembly parts rigidly and accurately throughout the various successive assembly operations, thereby preventing what has been termed "tolerance growth." Heretofore, precision clamping and holding devices which were both positive in action and self-locating in operation were not available, and as a result, for example, misaligned or oversized rivet holes were frequently encountered in automatic assembly operations. In the aircraft industry this posed a particularly critical problem since the high speeds and high stresses encountered by present day aircraft require precise mating of the various elements of riveted structures. A precision clamp was needed which would be light in weight, positive in operation, uniform in action, simple to operate and easy to maintain.

The clamp of the present invention is designed to fit these various desirable requirements, and it is particularly adapted for use in aircraft production in connection with the well known "picture frame" type of riveting fixture which is common in the aircraft industry. It is to be understood, of course, that the clamp is adapted for association with a variety of jigs and fixtures, and reference herein to the picture frame fixture of the aircraft industry is purely for illustrative purposes and not intended to be limiting. Indeed, the present clamp is useful wherever it is important to have positive location and secure clamping of work for the performance of operations thereon by hand tools or by automatic tools.

The picture frame fixture, as is well known to those skilled in the aircraft manufacturing art, comprises a rigid tubular frame-work shaped to define an inner open area within which the work is positioned and supported, much as the name of the fixture implies. The clamps of this invention serve to secure the work within the inner open area of the fixture, and since the fixture is usually made of comparatively light weight material, the combination of work, clamps, and fixture may be easily moved from one assembly station to the next. The present clamp is well suited to this arrangement, being characterized by a positive locating action and a quick acting clamping mechanism. The clamp is adapted to be rigidly positioned through the frame of the picture frame fixture (or other fixture as the case may be), and it embodies a rigid locating member and a movable hook member which may be quickly adjusted inwardly or outwardly by actuation of a conveniently located knob or handle portion to bring the work against the locating member. The hook member bears against the work with a steady, uniform supporting and clamping pressure thereby arranging and holding the work in a predetermined position. The degree of clamping pressure and the position of the clamp locator may be adjusted, if desired, so that work of various sizes and shapes may be accommodated by the fixture and clamp arrangement. The clamps are compact in size in order to clear the throat area of automatic riveting machines and the like, and also to permit maximum access to the clamped work.

Accordingly, it is an object of the present invention to provide an improved clamp for locating and securing material in position for work thereon.

Another object of the invention resides in the provision of a unique clamping device which is adapted to positively locate work in a predetermined position and simultaneously exert a uniform clamping pressure thereagainst.

It is an additional object of the invention to provide a movable holding device for maintaining work in position, and which is adapted for adjustable, rigid mounting through a suitable fixture frame.

A further object of the invention is the provision of an improved clamp for rigidly maintaining work in clamped relationship, and which embodies a holding member and a handle member which cooperates with internal mechanism of the clamp to quickly position the holding member against the work.

A still further object of the invention is to provide a unique composite clamp which embodies a mechanism actuable for urging a clamp member against the work to bring the work against a locating element which is integral with the clamp and which is adapted for adjustment to various positions.

Yet another object of the invention is to provide a novel movable clamp which combines both clamping and locating mechanism in a single unit and which is compact and light in weight, adapted for precision operation, simple to operate, and relatively inexpensive to manufacture and maintain.

Other objects and features of the present invention will be readily apparent to those skilled in the art from the following specification and appended drawings wherein is illustrated a preferred form of the invention, and in which:

Figure 1 is a cross sectional view of a preferred embodiment of the clamping device of the present invention;

Figuer 2 is a perspective view of the clamping device of Figure 1 illustrating a typical association of a workpiece therewith, the work-piece being shown in phantom outline;

Figure 3 is a partial perspective view of a second embodiment of the clamp of the present invention;

Figure 4 is a side view of the clamp of Figure 3; and

Figure 5 is a sectional view along the line V—V of Figure 1, with certain of the structures omitted for clarity.

Referring to the drawings, and more particularly to Figures 1 and 2, there is illustrated a preferred embodiment of the clamp of the present invention which is designated by the numeral 11, and which is particularly adapted for use in connection with a fixture 12 of the well known "picture frame" type. For simplicity and brevity of presentation, only a portion of fixture 12 is shown in Figures 1 and 2, it being understood that fixture 12 is a continuous peripheral frame type mount and is generally shaped to outline or bound an open inner area in which a component or workpiece 13 may be held. It is contemplated that a plurality of clamps 11 will be used to hold work 13 in position, each of the clamps 11 being appropriately disposed about the periphery of work 13 through the support afforded by the surrounding continuous tubular frame of fixture 12.

Clamp 11 is mounted through a tubular mounting spacer 14 which is disposed within fixture 12 through an opening 15 provided in the right or external side wall of fixture 12. The left end of spacer 14 abuts against the left or inward side wall of fixture 12, and the right end of spacer 14 abuts against the inner face of a nut 16 which in turn bears against the outward side wall of fixture 12. Nut 16 is held in position against fixture 12 by a second nut 17, and a pair of nuts 18 and 19 are similarly disposed at the opposite end of spacer 14, each of nuts 16, 17, 18 and 19 being threadably mounted upon a tubular body element or holder 21 which is disposed through tubular spacer 14. Rotation of either nut 16 or nut 18 serves to rigidly maintain holder 21 in a predetermined position relative to fixture 12, spacer 14 serving to prevent buckling of the walls of fixture 12 when these nuts are tightened. This method of securing clamp 11 through the frame of fixture 12, rather than locating it above or below the frame is a desirable feature of the present invention for the reason that fixture 12, together with the work 13 and the plurality of clamps 11, can be passed through the throat of a riveting machine (not shown) without danger of entanglement between these components and the machine.

Within the bore of tubular holder 21 of clamp 11 there is slidably disposed a tie rod 22 which is adapted to rotatably carry a handle or knob 23 at its outward end. Knob 23 is maintained upon rod 22 by a peened end portion 24 of rod 22 and by a washer 25.

Knob 23 is provided with an internal bore 26 which accommodates an internally threaded bushing 27, the internal position of bushing 27 within bore 26 being determined by an annular shoulder 28 formed in bore 26. Bushing 27 is maintained or secured in position by a conventional set screw 29 which cooperates with a suitable depression in the external periphery of bushing 27 so that any rotation of knob 23 effects common rotation of bushing 27. The internal threads of bushing 27 are adapted to engage and cooperate with external threads 31 at an undercut end portion of tubular holder 21 whereby clockwise rotation of knob 23 effects movement of tie rod 22 to the right or outwardly, and similarly counterclockwise rotation of knob 23 effects movement of rod 22 to the left or inwardly. Immediately to the left of threads 31 on the undercut end portion of holder 21 is a smooth unthreaded portion 32 over which bushing 27 and knob 23 are adapted to slide when bushing 27 and threads 31 are disengaged by a continued counterclockwise rotation of knob 23. With this construction a pulling movement on knob 23 causes tie rod 22 to be moved quickly outwardly to the right since knob 23 can now slide over unthreaded portion 32, and then a slower outward movement is effected by rotating handle 23 clockwise so that bushing 27 engages threads 31, as previously described. Conversely, to move tie rod 22 inwardly from the position illustrated in Figure 1, initial counterclockwise rotation of knob 23 produces a gradual leftward or inward movement of rod 22 until bushing 27 becomes disengaged from threads 31, at which time a pushing action on knob 23 will force rod 22 inwardly relatively rapidly since bushing 27 is in condition to slide over unthreaded portion 32 of holder 21.

The inward or left end of holder 21 is provided with a vertical slot 33 and a horizontal slot 34, both of which slots 33 and 34 extend transversely through the tubular walls of holder 21. Vertical slot 33 is suitably enlarged at its inward end so that it may accommodate a locator 35, a pair of pins 36 or other suitable fasteners are provided to secure locator 35 in fixed position within slot 33, as illustrated. The left end of locator 35 is adapted to abut against a portion of work 13, as is particularly illustrated in Figure 2, to thereby positively locate or position work 13 in some desired predetermined position relative to fixture 12. Locator 35 may of course take any desired form for best accomplishing the desired operation upon work 13, the form shown being merely illustrative, and locator 35 may be removed for replacement with a different locator as desired. It is to be noted that by adjusting the position of nuts 16, 17, 18 and 19 the longitudinal position of locator 35 may also be adjusted, thereby providing an adjustable positioning of clamp 11 relative to fixture 12.

A claw or hook member 37 is pivotably mounted at the inward end of tie rod 22 through a suitable vertical slot 38 in rod 22, slot 38 being in alignment with slot 33 of holder 21. Member 37 is pivotable about a pin 39 carried by rod 22, and is limited in its pivotal travel by contact with locator 35 at one side and with a collar 40 at the other side. Collar 40 is threadably mounted to holder 21 at the right of claw member 37, and it is maintained in position by any suitable means, such as by a usual set screw 40a as shown. Collar 40 serves not only as a stop means to limit the pivotal travel of member 37, but also serves to guide member 37 downwardly into engagement with workpiece 13. Further, since member 37 is mounted on rod 22 it is longitudinally movable bodily in response to longitudinal movement of rod 22, pin 39 being guided within horizontal slot 34 during such movement. Thus, upon pulling on knob 23 as previously described, rod 22 is moved outwardly or to the right, causing a corresponding movement of hook member 37 to the right. This initial movement is relatively quick, effecting movement of hook end 41 of member 37 in a generally arcuate path downwardly and to the right toward the work 13. Such initial movement is then followed by the slower clamping movement of member 37 against work 13 which is effected by rotation of knob 23. In this manner work 13 is quickly located against locator 35, and is clamped in position by rotating knob 23 until the desired clamping pressure is obtained.

In Figures 3 and 4 there is illustrated a second embodiment of the present invention which is substantially similar to the embodiment just described. The differences between the first and second embodiments include the substitution of a clamp member 42 for member 37 of the first embodiment, the elimination of collar 40, and the provision of a locator 43 at the inner end of tie rod 22 in substitution for the locator 35 of the first embodiment. Locator 43 is designed to accommodate a curving workpiece and thus is curved at its projecting end as illustrated. The clamping member 42 which cooperates with locator 43 comprises a cylindrical sleeve element 44, which is slidably disposed about the inward end of holder 21 and welded at its base to a longitudinally extending element 45. To the left end of element 45 is welded a fitting 46 which like locator 43 is adapted to accommodate a curving work surface. It will be apparent that various forms of locators and clamping members may be fitted to the end of unthreaded portion 32, as dictated by the configuration of the particular workpiece involved, and the embodiments of the present invention herein described are merely illustrative of two forms of locators and clamping members which may be employed.

Operation of the embodiment of Figures 3 and 4 is very similar to the operation of the first embodiment, movement outwardly of rod 22 upon pulling of knob 23 bringing fitting 46 toward locator 43, and subsequent clockwise rotation of knob 23 effecting a clamping action of the work between the opposite faces of locator 43 and cylindrical fitting 46. Conversely, inward movement of rod 22 is effected by reversing this sequence.

While certain preferred embodiments of the invention have been specifically disclosed, it is understood that the invention is not limited thereto as many variations will be readily apparent to those skilled in the art and the invention is to be given its broadest possible interpretation within the terms of the following claims:

What we claim is:

1. A clamping device comprising a tubular body element adapted to be affixed to a work fixture, said body element provided with external screw threads, a member slidably disposed within and movable relative to said body element, a locator element secured to one end of said body element, clamping means secured at one end of said movable member, and an actuating knob rotatably mounted on said movable member and having screw threads engageable with said screw threads of said body element for applying an axially directed force to said movable member upon rotation of the knob to bring said clamping means into operative association with said locator element whereby a workpiece may be clamped therebetween in a predetermined position relative to said work fixture.

2. A clamping device comprising a tubular holder element having an externally threaded portion and an adjacent unthreaded portion, a movable member operatively supported upon said holder element, a locator element secured to one end of said holder element, clamping means secured at one end of said movable member, and actuating means for moving said movable member to bring said clamping means into operative association with said locator element whereby a workpiece may be clamped therebetween, said actuating means including a member movably mounted on said movable member adapted for free slidable reciprocable movement over the unthreaded portion of said holder element and adapted for subsequent engagement with the threaded portion of said holder element for enabling initial rapid movement of said clamping means followed by a slower threadably advanceable clamping movement of said clamping means to thereby quickly position and secure said workpiece in a predetermined position relative to said holder element.

3. A clamping device comprising a tubular body element adapted to be releasably mounted to a work fixture, a member disposed within and movable relative to said body element, said member being adapted for both sliding axial movement and threadable rotational movement, a locator element secured to one end of said body element, clamping means secured at one end of said movable member, means rotatably mounted on said movable member and slidably movable relative to said body element for initially axially slidably moving said movable member to bring said clamping means into operative association with said locator element and for subsequently threadably moving said movable member whereby a workpiece may be clamped therebetween in a predetermined position relative to said work fixture, said body element being adapted for adjustment relative to said work fixture whereby said predetermined position may be adjusted, and means adapted for maintaining said body element in adjusted position.

4. A clamping device comprising a tubular holder element having an externally threaded portion and an adjacent unthreaded portion, a member mounted within said holder element for axial and reciprocable free sliding movement and axial and reciprocable threadably controlled movement with respect to said holder element, a locator element secured to one end of said holder element, clamping means secured to said movable member, and actuating means rotatably mounted to said movable member and adapted to slide reciprocably over the unthreaded portion of said holder element to effect relatively rapid axial locating movement of said movable member, said actuating means also being adapted for rotative, threadable engagement with the threaded portion of said holder element to effect axial clamping movement of said movable member, whereby a workpiece may be quickly located and secured between said locator element and said clamping means in a predetermined position relative to said holder element.

5. A clamping device comprising a movable member, a longitudinally extending holder element adapted to slidably accommodate said movable member, said holder element embodying a longitudinally extending transverse slot therethrough, locating means secured to one end of said holder element, a pin secured to said movable member and slidably carried within said slot, a hook member pivotally carried at one end by said pin, guide means carried by said holder element adjacent said pivoted end of said hook member, and means for moving said movable member to bring said hook member toward said locating means and into engagement with said guide means whereby said hook member is urged by said guide means and said movable member in an arcuate path toward said locating means and toward said movable member whereby a workpiece may be clamped against said locating means.

6. A clamping device comprising a longitudinally extending tubular element adapted for fixed association with a relatively stationary structure and embodying a slotted portion, a member slidably disposed and actuable for movement within said tubular element, a pin secured to said slidable member and slidably carried within said slotted portion, a hook member pivotally carried by said pin, a locator secured at one end of said tubular member, collar means adjustably carried by said tubular element and having a guide surface engageable by a surface of said hook member, and actuating means for effecting movement of said slidable member to bring said hook member toward said locator and into engagement with said collar means whereby said hook member is urged by said collar means and said slidable member in an arcuate path toward said locator and toward said movable member whereby a workpiece may be clamped by said hook member against said locator in a predetermined position with respect to said relatively stationary srtucture.

References Cited in the file of this patent

UNITED STATES PATENTS

| 483,336 | Wilson | Sept. 27, 1892 |
| 763,226 | Walden | June 21, 1904 |
| 794,482 | Best | July 11, 1905 |
| 2,116,263 | Harbaugh | May 3, 1938 |
| 2,472,022 | Neal | May 31, 1949 |
| 2,669,013 | Wilson | Feb. 16, 1954 |

FOREIGN PATENTS

| 14,915 | Great Britain | Sept. 22, 1890 |
| 259,903 | Switzerland | July 1, 1949 |